Patented May 3, 1949

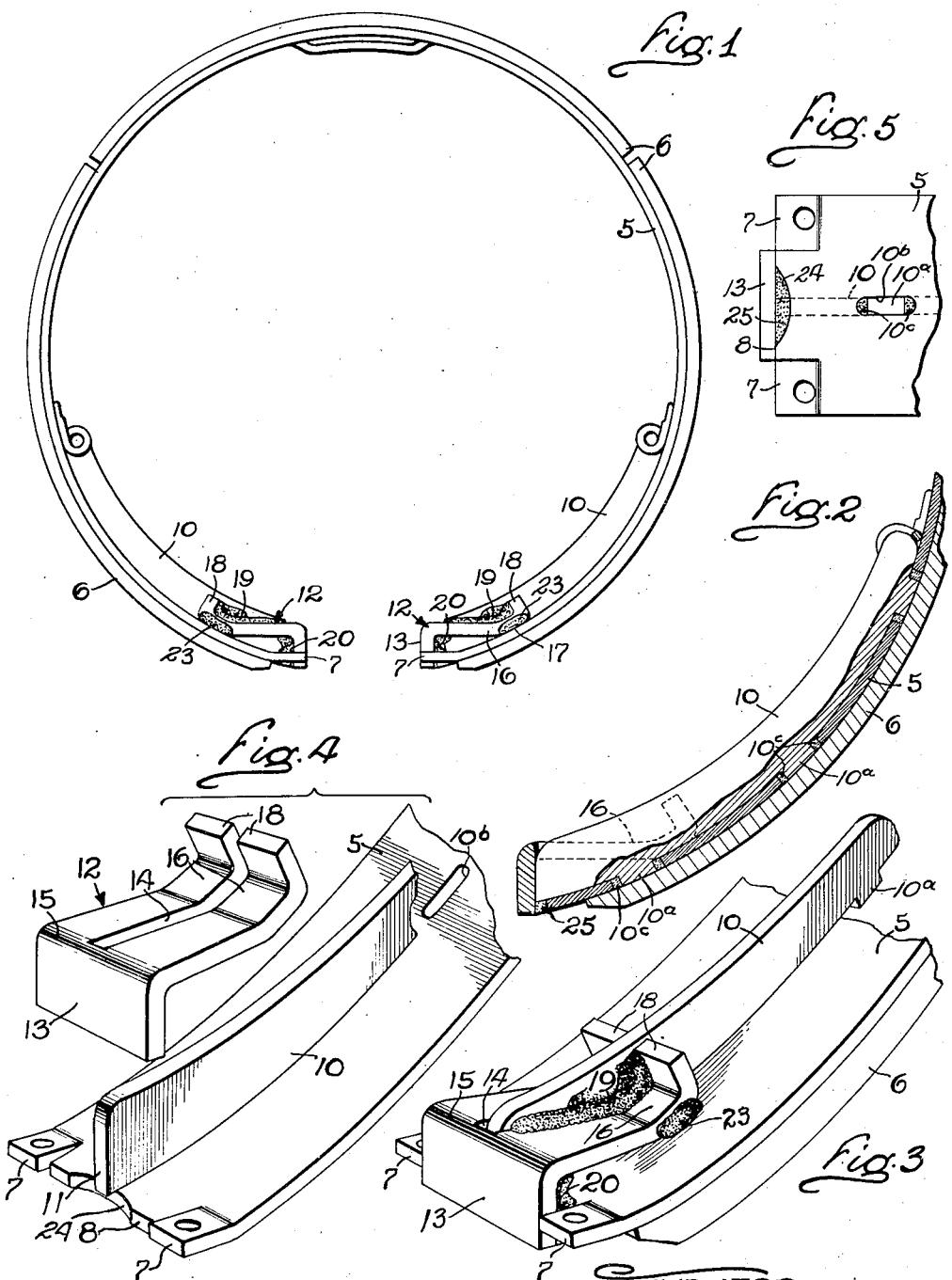

2,469,127

UNITED STATES PATENT OFFICE 2,469,127

FRICTION ELEMENT FOR BRAKES

John George Oetzel, Beloit, Wis., assignor to Warner Electric Brake Manufacturing Company, South Beloit, Ill., a corporation of Illinois Application October 12, 1944, Serial No. 558,296

8 Claims. (Cl. 188—250)

This invention relates to a friction element for use in a brake of the internal expanding type, and the general object is to provide a novel shoe end construction which is simple and inexpensive to construct, which is extremely rigid, and which is made of sheet metal stampings.

A more detailed object is to provide a member defining an end for a ribbed friction element and having bracing members lying adjacent opposite sides of the shoe rib.

The invention also resides in the novel construction of the parts which facilitates welding of the same together to form a rigid truss structure at the end of the friction element.

Other objects and advantages of the invention will become apparent from the following detailed description taken in connection with the accompanying drawings, in which Figure 1 is an elevational view of a friction element embodying the novel features of the present invention.

Fig. 2 is a fragmentary sectional view of one end of the element, the section being taken along one of the center ribs.

Fig. 3 is a perspective view of one of the shoe ends.

Fig. 4 is a similar perspective view partially broken away.

Fig. 5 is a fragmentary outside plan view of a modified form of the shoe end construction.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

The invention is shown in the drawings incorporated in a friction element or shoe of the so-called band type comprising a flexible sheet metal band 5 having segments 6 of friction material arranged in end to end relation and secured as by riveting to one side of the band. The element is curved according to the internal contour of the drum in which the element is to be used and, if desired, may be divided into a plurality of parts depending on the number of shoes to be provided in the brake. Lugs 7 on opposite sides of each end 8 of the band are apertured to receive return springs for contracting the friction element, and, in this instance, the lugs are bent inwardly slightly so that the corresponding lugs on opposite ends of the band are substantially alined. In Figs. 1 to 4, the lugs 7 project beyond the band end 8, while in Fig. 5 the lug ends are substantially flush with the band ends.

Each end portion of the band is reinforced and made relatively rigid by a single flat sheet metal rib 10 which is disposed perpendicular to the band and lies against the inner or concave surface of the latter for a substantial length and along the longitudinal center line thereof. The rib tapers longitudinally, and the wide end 11 is substantially flush with squared end surfaces 8 of the band. To secure the rib to the band, lugs 10ª spaced along the outer edge of the rib project through longer slots 10ᵇ in the band and are fastened by welds 10ᶜ disposed within the slots.

The rib and the end portion of the band are joined to form a rigid truss structure by a sheet metal member 12 bent intermediate its ends to substantially V-shape and having one flat end portion 13, the other end portion having formed therein a slot 14 which is slightly wider than the thickness of the rib 10 and extends from the bend 15 throughout the length of the portion so as to divide this portion into two parallel legs 16. The end portion 13 is disposed between the lugs 7 and abuts against the end 11 of the rib 10 with its free end abutting the end surface 8 of the band.

The legs 16 straddle the rib 10 and converge toward the inner surface of the band which they contact at points 17 spaced from the band ends. The ends 18 of the legs are bent away from the band substantially at right angles. Inwardly opening pockets are thus formed in which metal 19 may be deposited by welding to secure the legs and the ribs together substantially throughout the lengths of the legs. Such welds are formed on both sides of the rib 10, and, if desired, other welds 23 may join the legs 16 and the band adjacent the points 17. In a similar way, welds 20 are formed to unite the end portions 13, the legs 16, the rib 10, and the band. Herein, the band end is recessed as indicated at 24 to facilitate the formation of a weld 25 connecting the band end, the rib end, and the end portion 13.

It will be observed that the legs thus joined to the rib 10 and band effectively brace the portion 13 whose outer flat face constitutes an abutment for engagement with an anchor and with an actuating device by which the two band ends may be separated to expand the friction element. The welds 19 and 20 unite the bent member 12, the rib 10, and the band end to form an extremely rigid truss structure. All of the parts are inexpensive sheet metal stampings which may be assembled easily and secured together by simple welding. A friction element of extremely durable construction may thus be formed at low cost.

I claim as my invention:

1. A friction brake comprising an arcuate member, a flat rib secured to and extending along one end of said member on the concave side thereof, a cross plate having one end portion lying adjacent the end of said member and said rib, the other end portion being bent substantially at right angles to said first portion and divided into two legs straddling said rib and converging toward said member in a direction away from said first end portion, the ends of said legs being bent away from the member, and welds formed along opposite sides of said rib and the inner and outer margins of said legs to secure the latter to the rib and said member respectively.

2. A friction brake element comprising an arcuate band, a rib extending along the concave side of said band to the end thereof and secured to the band along the center line of the latter, a plate having an open ended longitudinal slot dividing one end portion into two legs straddling said rib, the other end portion of said plate being bent to lie adjacent the end of said rib and to project toward the band with its free end lying adjacent the band end, and welds formed along the junctions of said rib with the end portions of said plate.

3. A friction element having a central rib reinforcing one end, a member bent intermediate its ends with one end portion lying adjacent the end of said rib to provide an end abutment surface on said element, the other end portion of said member converging from a point spaced laterally from said element to a point adjacent the element and spaced from the end thereof, said latter end portion being divided into two parts straddling said rib, and means securing said rib and member rigidly together.

4. A friction element comprising a member having a rib extending to one end, a metal piece having a slotted end portion straddling said rib and diverging away from said member toward the end thereof, the other end portion of the piece being bent toward said member and lying adjacent the end of said rib, and means securing said piece, said rib, and said member rigidly together.

5. A friction element comprising a member having a rib extending along one end portion, a cross plate at the end of said rib providing an end abutment on said member, braces respectively lying along opposite sides of said rib and diverging away from said member toward said cross plate, and means securing said cross plate, said rib, said braces, and said member rigidly together.

6. A friction element comprising a member having a rib extending to one end, a plate extending across the end of said rib with one end disposed adjacent said member and the second end spaced therefrom, braces respectively extending along opposite sides of said rib away from the second end of said plate and converging toward said member and away from the end of the latter, and means rigidly securing said plate, said rib, said braces, and said member together to form a rigid truss structure.

7. A friction brake element comprising an arcuate band, a rib extending along the concave side of said band to the end thereof and secured to the band along the center line of the latter, a cross plate lying adjacent the end of said rib, a member inclined relative to said band and extending along one side of said rib between the inner end of said cross plate and the concave side of said band to brace the former, and welds uniting said plate, said rib, said band, and said bracing member into a rigid truss structure.

8. A friction element comprising a band, a rib extending along one side of said band to the end thereof, a cross plate lying adjacent the end of said rib, a brace integral with said cross plate at the edge of the cross plate remote from said band and inclined toward and against a side of the band spaced from the band end whereby to form a triangle with the band and cross plate, said brace being disposed alongside said rib, and means for connecting the parts of said triangle into a rigid truss structure and uniting the latter with said rib.

JOHN GEORGE OETZEL.

REFERENCES CITED

The following references are of record in the file of this patent:

UNITED STATES PATENTS

| Number | Name | Date |
|---|---|---|
| 1,264,820 | Lee | Apr. 30, 1918 |
| 1,673,417 | McConkey | June 12, 1928 |
| 1,759,934 | Chanter | May 27, 1930 |
| 1,937,891 | Hunt | Dec. 5, 1933 |